Patented Oct. 24, 1922.

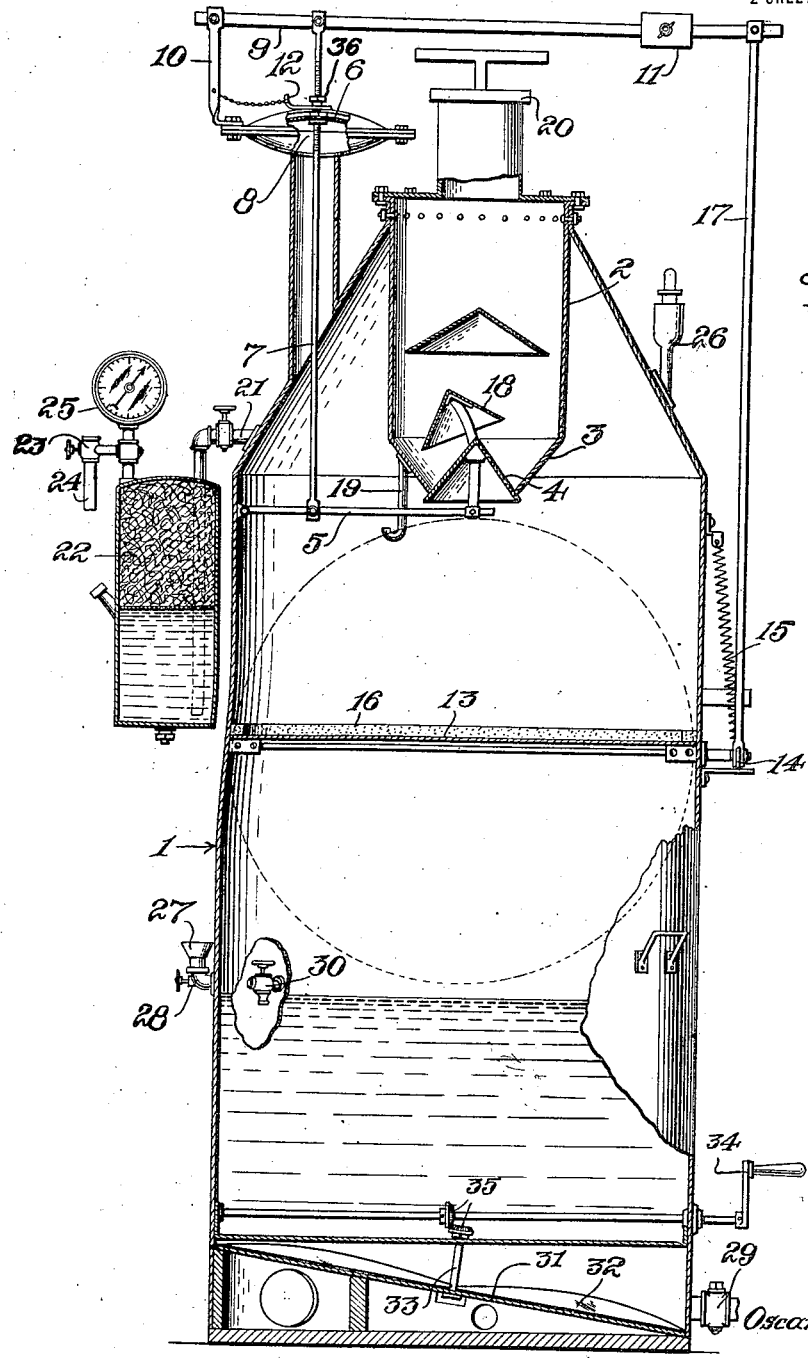

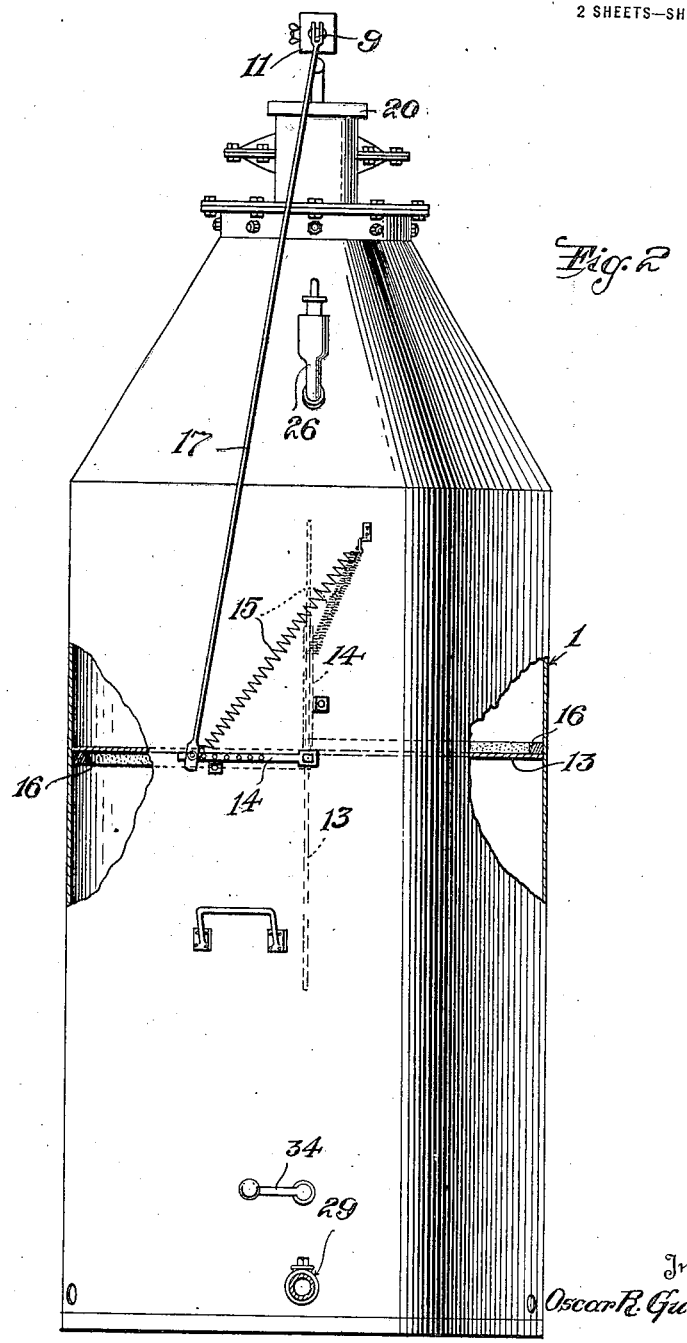

1,433,003

UNITED STATES PATENT OFFICE.

OSCAR R. GUNN, OF TULSA, OKLAHOMA.

PORTABLE ACETYLENE GENERATOR.

Application filed July 17, 1920. Serial No. 397,054.

*To all whom it may concern:*

Be it known that I, OSCAR R. GUNN, citizen of the United States, residing at Tulsa, county of Tulsa, State of Oklahoma, have invented an Improvement in Portable Acetylene Generators, of which the following description, in connection with the accompanying drawings, is a specification, like characters on the drawings representing like parts.

The invention aims to overcome difficulties experienced with portable generators in the hands of careless or inexperienced workmen on out-door construction and repair work, and to provide a simple, strong and safe generator with automatic carbide feed, free from liability of derangement, and easily cared for, all at low cost.

The invention is adapted to supply acetylene gas directly for torches for cutting and welding purposes, both indoors and out, and to the production of acetylene gas for lighting, heating and other purposes under all sorts of conditions.

For the purpose of illustrating the invention and its manner of operation, reference is made to the following description and to the accompanying drawings of a preferred form of device embodying the invention.

In the drawings, Fig. 1 is a vertical central section of a portable acetylene generator showing the parts in locked position for transportation; and Fig. 2 is a side view of the same.

The invention may be applied to automatic acetylene generators of any of the types wherein the carbide is fed from above into a quantity of water contained in the lower portion of the generator.

The device chosen for illustration consists of a strong tank 1 made for example in the form of an up-right cylinder having bottom, side and top members of sheet steel welded together, as shown in the drawings. The carbide receptacle 2 is adjustably secured to the top of the cylinder with its bottom projecting down into the tank. The bottom 3 of the carbide receptacle slopes down to a hole in its middle which is adapted to be closed by a vertically movable conical member 4 which, when dropped to open position, constitutes a spreader for distributing the carbide as it is fed into the tank. The hopper bottom closure or spreader 4 is mounted upon an arm 5 which is pivoted to the side of the cylinder below the carbide receptacle to swing up and down, and is controlled in its movement by means of a diaphragm 6 which is connected to it by a link 7.

The diaphragm is contained in a pressure chamber 8 secured on top of the cylinder in communication with the tank so as to be responsive to fluctuations of gas pressure in the tank. The link 7 is adjustably connected to the diaphragm 6 and sticks up through the pressure chamber, its projecting top end being pivoted to a lever arm 9 which is mounted in a bracket 10 on the top of the tank. The arm carries a sliding weight 11 for the purpose of adjusting the gas pressure within the tank necessary to raise the diaphragm to close the carbide feed in the bottom of the hopper. A safety catch or lock 12 may be applied to the projecting end of the link 7 to hold it up and keep the feed opening closed.

Beneath the carbide hopper and between it and the water in the bottom of the tank is a movable splash arrester and closure member 13 operated by a handle 14 which projects out of the side of the tank and which is normally held in inoperative position by means of a spring 15, as shown in dotted lines in Fig. 2. A rubber or other suitable packing material 16 is fitted to the inside of the tank for the closure member to seat against. A rod 17 is provided for connection at will to the handle 14 and the end of the weight arm 9 so as to hold the closure member in its operative position across the tank, and hold up the weight arm and close the hopper feed opening. As shown in Figs. 1 and 2 this rod is connected to the handle 14. In such position of the parts the carbide cannot feed from the hopper and water cannot reach the carbide in case the apparatus should be violently shaken or upset.

In the normal generating position of the device the rod 17 is disconnected from the handle 14.

As an additional safeguard, the arm 5 has an upward extension at its end which projects through the bottom hole in the hopper and carries a conical shield 18 at its upper end. In case of breakage of the arm or link 7 this shield will drop and close the carbide feeding opening. A hook 19 is attached to the bottom of the hopper to arrest the downward movement of the arm 5 in position to close the opening. The adjusting nut 36 on the projecting end of the stem under normal working conditions arrests its downward movement before it has been dropped enough to permit the shield 18 to close the feed opening.

The hopper 2 has a carbide filling opening in its top closed by a suitable cap or plug 20; and the tank has a gas outlet 21 in the side of the cylinder leading to a suitable filter and drier 22 from which the gas is drawn off through a valve 23 into the supply pipe 24. The tank is fitted with a suitable pressure guage 25 and safety valve 26, located near its top; and near its bottom is provided with a filling pipe or opening 27 for water, closed by a valve 28, and with a blow-off cock 29 for discharging dirty water and sediment. A plug 30 is screwed into the side of the tank at approximately the normal water level to permit air to escape in filling and to indicate when the tank is sufficiently full.

The bottom 31 of the tank is inclined downward toward the blow-off cock opening, and a movable blade or stirrer 32, mounted on a shaft 33 may be rotated over it by means of the handle 34 which projects from the side of the tank below the splash arrester and drives the shaft 33 through gears 35 or other suitable connection.

In the operation of the generator, first the tank is filled with water up to the overflow hole. Then the carbide receptacle is filled to capacity with carbide broken in fine particles of fairly uniform size. During this operation the weight arm is held by the safety lock 12 to close the hopper. Upon removing the safety lock 12 the weight arm and distributor 4 will drop and permit carbide to fall into the water and form acetylene gas.

The carbide will continue to feed into the tank until the pressure of the gas formed lifts the diaphragm and closes the hopper opening. The connection between the diaphragm and link 7 is adjusted so that the diaphragm bears against the top of the pressure chamber when the pressure is greater than that required to close the hopper and thereby the diaphragm is protected against rupture.

The capacities of the carbide receptacle and tank up to the overflow plug 28 are made such that a sufficient amount of water will be contained to gasify all of the carbide the receptacle will hold. The shape and size of the tank and carbide receptacle are such that if the tank should accidentally be tipped over the water would not reach the carbide even should it leak through the splash arrestor, but would be contained in the low side of the tank below reach of the hopper opening.

It is noted that the parts within the tank are of the upmost simplicity and are substantially constructed so that they are very unlikely to break or get out of order.

The feeding of the carbide is automatic during normal operation of the device; but may be stopped and controlled by hand if desired; and the feeding device may be locked so that the generator can be subjected to very rough handling without danger.

The invention is not restricted to the details of construction and arrangement of parts illustrated.

What is claimed as the invention is as follows:

1. An acetylene generator having a tank adapted to contain water, a carbide receptacle arranged above said water and provided with means for normally feeding carbide into the water, and means independent of the carbide feeding means adapted to be interposed between said carbide feeding means and the normal level of water in said tank for preventing commingling of water and carbide, said preventing means having a detachable connection with said carbide feeding means under the control of the operator for rendering the latter inoperative.

2. An acetylene generator comprising a pressure tank disposed vertically and divided into top and bottom compartments by means of a movable partition, carbide feeding means in the top compartment, means in the bottom compartment for containing water and for removing sludge, and means independent of the carbide feeding means for holding said partition in closed position whereby said device may be safeguarded against admixture of carbide and water.

In testimony whereof, I have signed my name to this specification.

OSCAR R. GUNN.